United States Patent [19]

Hawe et al.

[11] Patent Number: 4,741,790

[45] Date of Patent: May 3, 1988

[54] AQUEOUS ADHESIVES AND THEIR USE

[75] Inventors: Malcolm Hawe; David Farrar, both of West Yorkshire, England

[73] Assignee: Allied Colloids Limited, England

[21] Appl. No.: 894,346

[22] Filed: Aug. 7, 1986

Related U.S. Application Data

[63] Continuation-in-part of Ser. No. 766,096, Aug. 15, 1985, Ser. No. 766,097, Aug. 15, 1985, and Ser. No. 766,098, Aug. 15, 1985, abandoned.

[30] Foreign Application Priority Data

Aug. 12, 1985 [GB] United Kingdom ............... 8520218
Feb. 14, 1986 [GB] United Kingdom ............... 8603655

[51] Int. Cl.$^4$ ............................................. B05D 5/10
[52] U.S. Cl. ................................. 156/71; 427/207.1; 524/558; 526/320
[58] Field of Search ............... 428/511, 514, 355; 524/543, 555, 558; 526/304, 320, 332, 333; 427/207.1; 156/71

[56] References Cited

U.S. PATENT DOCUMENTS 4,291,101  9/1981  Tanizaki ........................... 428/514
4,355,074  10/1982  Stemmler et al. ............. 427/207.1
4,529,658  7/1985  Schwartz ......................... 428/511

Primary Examiner—Paul R. Michl
Assistant Examiner—Patrick A. Doody
Attorney, Agent, or Firm—Andrus, Sceales, Starke & Sawall

[57] ABSTRACT

The combination of adhesion and rheology properties of aqueous adhesives the adhesive component of which is a water soluble or water swellable polymeric material can be improved by copolymerizing the monomers from which the polymeric material is obtained with an ethylenically unsaturated monomer that includes a pendant group —$A_mB_nA_pR$ where B is ethoxy, n is at least 2, A is propoxy or butoxy, m and p are each less than n and are preferably zero, and R is a hydrophobic group.

15 Claims, No Drawings

AQUEOUS ADHESIVES AND THEIR USE

This application is a continuation-in-part of Ser. Nos. 766,096 and 766,097, still pending, and Ser. No. 766,098, now abandoned, all filed Aug. 15th 1985.

This invention relates to aqueous adhesives in which the adhesive properties are due to the presence of a water soluble or water swellable polymer that is applied between the surfaces to be bonded while it is dissolved or swollen and is then dried to provide adhesion between the surfaces. Substantially all the polymer in the adhesive composition contributes to the adhesive properties and so substantially none of the polymer in the composition is present as, for instance, a non-adhesive thickener. If the composition needs to be thicker, the concentration of adhesive polymer is increased.

These aqueous adhesives are clearly distinguished from adhesives that may contain water but in which the adhesive properties are due to a polymer that is insoluble and non-swollen in water. For instance many adhesives are dispersions or emulsions in water of insoluble and non-swellable polymers such as insoluble acrylics and rubbers (e.g., a rubber latex). The water phase is often thickened by the presence of a soluble or swellable polymer so as to adjust the rheology of the adhesive but this thickening polymer makes no significant contribution to the adhesive properties of the adhesive.

Aqueous adhesives of the type with which the invention is concerned are widely used for bonding paper and other fibrous sheets to a substrate which may be another fibrous sheet (paper lamination) but is usually a wall, the adhesive then serving as a wallcovering adhesive. The adhesive may be a prepaste, that is to say a dry coating on the back of the sheet material and which is wetted prior to application. Alternatively it may be a brush-on adhesive that is applied to the substrate, generally by a brush.

The adhesives may be based on natural or modified natural polymers such as starch and cellulosic materials or may be used on synthetic polymers. Adhesives based on cross linked synthetic polymers are described in EP No. 8213 and blends particularly useful as prepastes are described in EP No. 77618. Adhesives based on water soluble synthetic polymers are described in GB No. 2054628.

A difficulty with aqueous adhesives that are based on synthetic polymers, especially those containing carboxylate groups, is that adhesion on some surfaces, especially bare plaster, may be unsatisfactory and it would be desirable to be able to achieve better wet adhesion on a range of surfaces such as emulsion paint, bare plaster, gloss alkyd and matt alkyd paints.

It is known that thickening of a continuous aqueous phase can be improved in some instances by including in the polymer pendant hydrophobic groups. In addition to the mechanisms of interparticulate attraction and solvent immobilisation an additional effect occurs within the continuous phase that gives the improved properties, and this additional effect is believed to be association within the aqueous phase between the hydrophobic groups in adjacent molecules. The polymers containing such groups are often referred to a associative thickeners. They have been proposed for thickening a wide range of suspensions and emulsions. For instance in GB 1,167,524 they are proposed for thickening, inter alia, rubber lattices, cosmetics, polishes, lubricants, insecticides, herbicides, fungicides, paint removers and adhesives. These adhesive thickeners will be of the type described above, namely for thickening the aqueous phase of a composition containing a dispersed non-swollen and undissolved polymer such as an insoluble rubber or acrylic polymer.

Various ways of introducing the hydrophobic groups have been proposed. In EP No. 48094 the hydrophobic group is introduced as a polymerisation initiator or chain transfer agent in the polymerisation of acrylamide. In EP No. 63018 and U.S. Pat. Nos. 4,423,199 and 4,524,175 the hydrophobic group is introduced as a substituent in acrylamide. In JP No. 60-235815A the pendant hydrophobic group is introduced as a vinyl ether.

In U.S. Pat. No. 3,915,921 and U.S. Pat. No. 4,190,562 the hydrophobic group is introduced as a $C_{10-30}$ alkyl ester of (meth) acrylic acid. In U.S. Pat. Nos. 4,138,381, 4,268,641, 4,384,096 and 4,463,151, EP No. 13836 and EP No. 109820 and in GB No. 1,167,524 an ester is formed between an unsaturated acid and a hydrocarbyl ether of a polyalkylene glycol.

In GB No. 1,167,524 the hydrophobic groups are introduced as an allyl ether or an unsaturated carboxylic ester and in GB No. 1,273,552 the hydrophobic groups are introduced as an allyl ether. It is well known that allyl monomers, even when present in very small quantities, make it difficult to obtain high molecular weight (see for instance "Functional Monomers" Volume 1 edited by Yocum and Nyquist page 384) and in U.S. Pat. No. 4,451,628 allyl sulphonate is used to depress the molecular weight of copolymers. It is apparent that the techniques used in these British patents are techniques that favour the formation of low molecular weight. For instance in example 13 of GB No. 1167524 a copolymer of an acrylic ester carrying the hydrophobic group and acrylamide is made and the molecular weight is depressed by conducting the polymerisation in the presence of isopropanol. Accordingly the polymers of these two patents are inevitably of low molecular weight and this may explain why these polymers have not been commercially successful despite the success of the high molecular weight polymers such as those made by oil-in-water emulsion polymerisation, generally as indicated in EP 13836.

All these patents on associative thickeners are concerned with thickening a large volume of a continuous aqueous phase using a minor amount of polymer so as to produce a thickened fluid medium. The associative effect between the polymers involves association within the continuous phase between polymers that are in solution and/or interparticulate attraction between very small undissolved particles of the polymers.

We have now surprisingly found that the adhesive properties due to a water soluble or water swellable polymer in a wide range of aqueous adhesives can be improved by including in the polymer pendant hydrophobic groups connected to the polymeric backbone by a polyethoxy chain.

In the invention a fibrous sheet is bonded to a substrate using an aqueous adhesive the adhesive component of which is water soluble or water swellable polymeric material which comprises a copolymer of (a) 20 to 99% ethylenically unsaturated ionic monomer (b) 0 to 70% ethylenically unsaturated non-ionic monomer (c) 0 to 1% cross linking agent (d) 1 to 70% of ethylenically unsaturated monomer that carries a pendant group —$A_mB_nA_pR$ wherein B is ethyleneoxy, n is an integer of at least 2, A is propyleneoxy or butylenoxy, m and p are each an integer less than n and preferably below 2 and most preferably zero, and R is a hydrophobic group containing at least 8 carbon atoms. Throughout this specification all percentages are by weight unless otherwise specified.

R can be a polyoxyalkylene chain where the alkylene groups wholly or mainly are propylene or higher but preferably is a hydrocarbyl group. The hydrocarbyl group generally contains from 8 to 30, preferably 10 to 24 and most preferably 12 to 18 carbon atoms. It may be selected from alkyl, for instance octyl, lauryl or stearyl, aralkyl such as 2-phenyl ethyl (—$C_2H_4Ph$), aryl such as naphthyl, alkaryl such as alkyl phenyl wherein the alkyl group generally contains 6 to 12 carbon atoms, cycloalkyl (including polycyclic alkyl groups), or mixtures of one or more such groups. Preferred hydrocarbyl groups are alkyl and alkaryl groups. Any of these groups may additionally be substituted provided the substituents do not render the pendant group hydrophilic to an extent that the desired improvement in properties due to the hydrophobic group is lost.

The polyoxyethylene chain ($n \geq 2$) may be interrupted by oxypropylene groups but preferably m and p are each 0. The properties of the final polymer can be controlled by appropriate selection of n, m, p and R.

Results generally improve with increasing lengths of polyethoxy chain above 2 and preferably n is at least 5, most preferably at least 10 with best results generally being obtained when it is 15 or more, e.g., up to 50 or even 100.

The ethylenically unsaturated monomer (d) carrying the group —$A_mB_nA_pR$ is preferably a monomer of the formula $$R^1CH=C(R^2)QA_mB_nA_pR$$ 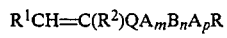

where A, B, n, m, p and R are as defined above and
$R^1 = COOR^3$ or $QA_mB_nA_pR$ when $R^2 = H$ and $Q \neq CH_2O$ or $O$ or $OR^5O$ or $R^1 = H$;
$R^2 = H$ or $CH_3$ or
$R^2 = CH_2COOR^3$ and $Q \neq CH_2O$ or $O$ or $OR^5O$ or
$R^2 = CH_2QA_mB_nA_pR$ and $Q \neq CH_2O$ or $O$ or $OR^5O$;
$R^3 = H$ or $C_1-C_8$ alkyl;
$Q = O$ or $OR^5O$ provided that $R^1$ and $R^2 = H$ or
$Q = CH_2O$, $COO$ or $CONR^4$ where $R^4 = H$ or $CH_3$ and $R^5 = C_{1-4}$ alkylene The hydrophobic group can therefore be introduced as, for instance, an acrylic ester of a surfactant alcohol or other group described in the patents listed above, but preferably the hydrophobic group is introduced as an allyl ether of a surfactant alcohol. Thus the monomer preferably has the formula $CH_2=CR'CH_2OA_mB_nA_pR$ where R' is hydrogen or methyl.

The allyl ethers may be made by methods such as those described in GB No. 1,273,552, for instance by reacting an appropriate surfactant alcohol with sodium or sodium alkoxide, generally in the absence of water but in a solvent such as xylene, to form the sodium derivative and then reacting this with allyl chloride, or by reacting allyl alcohol with the surfactant alcohol with or without catalyst. Preferably however the allyl ethers are made by the method described in our copending application filed even date herewith reference 60/2566 and entitled "Monomer Production".

The ionic monomer (a) is preferably a vinyl, generally acrylic, monomer and may be a co-ionic blend of monomers. When it is anionic it may be a carboxylic or sulphonic monomer generally containing 3 to 8 carbon atoms.

The preferred anionic monomers are ethylenically unsaturated carboxylic and sulphonic acids such as allyl sulphonate, 2-acrylamido-2-methyl propane sulphonate, methacrylic acid, itaconic acid, crotonic acid or, preferably, acrylic acid.

It is particularly preferred in the invention to use a cationic monomer as monomer (a). This is particularly beneficial as the presence of cationic groups gives optimum adhesion in some circumstances, for instance in the presence of calcium. However prior to the invention the incorporation of cationic groups has tended to result in an aqueous polymer having inferior rheology, but the cationic polymers of the invention can have very satisfactory rheology.

Suitable cationic monomers are cationic vinyl (generally acrylic) tertiary amines for instance dialkylaminoalkyl (meth) acrylates (generally as acid or quaternary ammonium salts). Any alkyl groups generally contain up to four carbon atoms and the preferred monomers are dialkylaminoethyl (meth) acrylates, especially where alkyl=methyl. Other suitable cationic monomers that may be used include dialkylaminoalkyl (meth) acrylamides where the aminoalkyl group generally includes an alkylene group of 2 to 8 carbon atoms, preferably 1,3-propylene, e.g., dimethylamino-1,3-propylene methacrylamide.

Depending upon the type of adhesive that is being made, monomer (b) may be water soluble, for instance acrylamide, or may be water insoluble or may be a blend of soluble and insoluble monomers. Suitable insoluble monomers (by which we mean soluble to the extent of less than 5% at room temperature) include styrene, alkyl- or dihalo-substituted styrene, acrylonitrile, vinyl or vinylidene chloride or other halide or vinyl acetate or other alkanoate but is preferably an alkyl-, hydroxy alkyl- or alkoxy alkyl-(meth) acrylate, most preferably a $C_{1-4}$ alkyl (meth) acrylate.

It is sometimes desired for the polymer to be wholly soluble but often best results are achieved if the polymer is insoluble but swellable. Solubility can be controlled by choice of ionic and, especially, non-ionic monomer but preferably by the incorporation of cross linking agent. Any of the conventional polyethylenically unsaturated monomers can be used as cross linking agents, e.g., methylene bis acrylamide or allyl methacrylate. Ionic cross linking agents can sometimes be used, e.g., aluminium sulphate. The amount of cross linking agent will be chosen to give the desired degree of swellability and is usually in the range 0.0005 to 1.0 (5 to 10,000 ppm) most preferably 0.01 to 0.2% or higher.

The adhesives in the invention can be formed as brush on adhesives, e.g., as dispersions or powders that are dissolved in water and then applied to the wallpaper, generally by brushing, but preferably the adhesive is a prepaste, i.e., a dried coating of the polymer that becomes adhesive when wetted with water. Preferably the adhesive consists solely of the defined polymer but if desired other swellable or soluble polymer can be blended with it generally in an amount of below 50% dry weight of the combined blend.

The invention is of particular value in "two-pack" prepastes. In these the aqueous adhesive is formed by wetting a dry prepaste coating on the substrate of an adhesive polymer that is insoluble and substantially non-swellable in water but the coating includes also an acid or alkali that reacts in aqueous solution with ionic groups in the polymer to render the polymer soluble or swellable in alkali. For instance a layer of acid or alkali is incorporated, generally over the layer of polymer, and this acid or alkali dissolves when the prepaste is wetted and converts the polymer to a soluble or swellable form. For this purpose the polymer is preferably made by oil in water emulsion polymerisation. The amount and solubility of monomers a and b must be such that the blend of monomers can be polymerised by oil in water emulsion polymerisation to form an emulsion of polymer that is insoluble but substantially unswollen in water but becomes soluble and swollen upon the addition of alkali or acid.

The amount of ionic monomer (a) must therefore be at least 10% and below 70%. Generally it is at least 20% and preferably at least 30%, and usually is below 60% preferably below 50%. Preferably it is acrylic or, especially, methacrylic acid when the monomer is anionic or else is one of the cationic monomers, especially dimethyl amino ethyl (meth) acrylate. However any of the ionic monomers mentioned above can be used. The ionic monomers are present in, for instance, free acid or free base form during the polymerisation and are converted to ionic salt form by addition of acid or base.

The non-ionic monomer may include some water soluble monomer but preferably at least 50% of it, and preferably 100%, is insoluble monomer such as those discussed above, preferably alkyl (meth) acrylate. Preferred monomers are butyl acrylate, methyl methacrylate and ethyl acrylate.

The prepaste may be applied in conventional manner and a dry coating of alkali (e.g., sodium carbonate) or acid (e.g., citric acid or adipic acid) may be incorporated in the prepaste, generally as a coating over the polymer.

A preferred polymer made by oil in water emulsion polymerisation is formed of 20 to 60% methyl or ethyl acrylate or methacrylate, 20 to 60% acrylic acid or methacrylic acid methyl or ethyl (meth) acrylate, 20 to 60% (meth) acrylic acid or one of the preferred cationic monomers and 3 to 30% of monomer (d), preferably the allyl ether, generally together with cross linking agent.

In another type of aqueous adhesive, monomers (a) and (b) provide a water soluble blend and the polymer is soluble or swellable in neutral water (pH 7). For instance the monomers may be 20 to 99% anionic or cationic water soluble monomer and 0 to 70% acrylamide, e.g., 70 to 97% sodium acrylate and 0 to 20% acrylamide or 20 to 60% sodium acrylate and 30 to 70% acrylamide, each generally with 3 to 30% of monomer (d) (preferably the allyl ether) and generally also with cross linking monomer (c).

Irrespective of the particular polymer type that is made, the polymerisation conditions are preferably such that if the polymer was free of cross linker it would have IV (single point intrinsic viscosity measured in methanol at 25° C. at 0.05% polymer concentration) of at least 1, generally at least 2 and usually at least 3, for instance 5 to 10 or even higher, for instance up to 20 or more.

If the monomers form a monomer blend that is insoluble in water they may be polymerised by oil in water emulsion polymerisation, for instance as in EP No. 13836, or by polymerisation in an organic solvent, for instance as in U.S. Pat. No. 4,138,381. If it is desired to produce the polymer as a dry powder it may be separated as described in EP No. 13836.

If the monomers form a water soluble blend then they may be polymerised by gel polymerisation or by reverse phase polymerisation (e.g., as in EP No. 0172724). After gel polymerisation the gel may be comminuted and dried in conventional manner to produce a powder. The reverse phase polymerisation may be conducted as a bead polymerisation followed by azeotropic distillation and filtration to give dry beads having a size of, for instance, between 20 and 500 microns, suitable for a brush-on paste. Alternatively it may be conducted to give a much smaller particle size, for instance below 10 microns as described in EP No. 8213, in which event cross linking agent is preferably included in an amount sufficient to render the particles insoluble and discrete, even when swollen.

A dispersion of these small particles, or a dispersion made from an oil-in-water emulsion by the technique described in EP 0172025 may be applied as a prepaste, and the organic solvent then evaporated, or may be blended into water to form a brush-on paste. A prepaste blend may be provided as in EP 77618.

If the polymer is supplied in the form of dry particles the surface of the particles may if desired be rendered less swellable than the inner parts of the particles, preferably as a result of cross linking the surface layer. This treatment can reduce the stickiness of the particles and can improve the absorption properties.

It is already known to minimise aggregation of swellable polymer particles upon addition to water by providing the particles with a surface layer of reduced swellability, generally by cross linking, and any of these known methods may be used in the invention. The cross linking can be achieved by contacting the surfaces of the particles with a polyvalent metal salt or other cross linking agent. For instance in U.S. Pat. Nos. 3,114,651 and 3,251,814 particles are treated with a chromic salt. In JP No. 1983/42602 an insoluble water absorbent cross linked polymer is dispersed in a medium containing polyvalent metal salt or epihalohydrin. Other methods and materials are described in U.S. Pat. Nos. 4,043,952 and 4,090,013. Another method comprises coating the anionic particles with a cationic polymer, such as a polymer of diallyl dimethyl ammonium chloride. In another method we apply to the particles a solution in a solvent or solvent blend of sodium aluminate or other aluminate.

EXAMPLE 1

An emulsion of monomers in water was prepared by mixing 100 g of ethyl acrylate, 80 g of methacrylic acid, 20 g of allyl ether of 10 mole ethoxylate of stearyl alcohol, 5 g of Perlankrol ESD, 0.3 g ammonium persulphate and 200 g water. To a reaction vessel containing 2.5 g Perlankrol ESD, 0.1 g ammonium persulphate in 255.8 g water at 85° C., degassed for 30 minutes with nitrogen there was added 5% of the monomer emulsion over a period of 10 minutes. 0.2%, based on total monomer, dodecyl mercaptan was included. Perlankrol is a trade mark.

After the initial charge had polymerised at 85° C., the remaining monomer emulsion was gradually added over a period of two hours at 85° C. After completion of the monomer feed, the mixture was held at 85° C. for 15 minutes and then 10 g of 1% ammonium persulphate solution was added. After another 45 minutes, the mixture was cooled and filtered.

The filtrate was approximately 30% solids emulsion copolymer in which the polymer composition is 10% of the allyl ether, 50% ethyl acrylate and 40% methacrylic acid and was labelled A.

Polymer B was a commercially available alkali swellable wallpaper adhesive.

To test wet adhesion properties, solutions of the polymers in water at 2% were brushed on lengths of wallpaper, left for a period of time of up to 1 minute and the coated paper applied to vertical surfaces coated with emulsion paint, plaster and gloss alkyd and left for a period of time of up to 1 minute. The top end of each length of paper was peeled down until it was level with the bottom and then the period of time for the length of paper to remove itself entirely from the vertical surface recorded. The coated paper was applied to the surface twice more and timed as before until it removed itself. The results are as follows (time in seconds).

TABLE 1

| Surface | A | B |
|---|---|---|
| Emulsion paint | >240/>240/31 | 6/5/4 |
| Plaster | 19/3/3 | 3/2/2 |
| Gloss Alkyd | >240/>240/>240 | 13/3/4 |

The results show that on all three surfaces polymer A gave better wet adhesion than Polymer B.

EXAMPLE 2

The process of example 1 can be repeated using 20 g of the acrylic ester of the 10 mole ethoxylate stearyl alcohol, in place of the allyl ether.

EXAMPLE 3

The process of example 1 was repeated to produce polymers C to E using methyl methacrylate (MMA), dimethylaminoethyl methacrylate (DMAEMA) and the allyl ether of a 10 mole ethoxylate of stearyl alcohol (AES) in the proportions shown in Table 2, and 500 ppm of allyl methacrylate. Ethylan HD was used as the emulsifier in place of Perlankrol HSD. The resultant polymer emulsions were coated on to a paper substrate, dried, coated with citric acid and dried again.

Polymer B was coated on to a paper substrate, dried, coated with sodium carbonate solution and dried again.

The prepasted substrates were wetted with water and the wet adhesion properties were tested as in Example 1 on an emulsion coated surface. The results are shown in Table 2.

TABLE 2

| | Polymer | | | |
|---|---|---|---|---|
| | B | C | D | E |
| MMA | — | 35 | 30 | 25 |
| DMAEMA | — | 45 | 50 | 55 |
| AES | — | 20 | 20 | 20 |
| Wet adhesion on emulsion | 2/4/4 | 7/3/3 | 49/6/3 | 74/19/8 |

The polymers of the invention, containing the allyl ether, gave very much better wet adhesion on emulsion paint.

We claim:

1. A method in which a fibrous sheet is bonded to a substrate using an aqueous adhesive the adhesive component of which is selected from water soluble polymeric materials and water swellable polymeric materials which comprise a copolymer of
   (a) 20 to 90% ethylenically unsaturated ionic monomer
   (b) 0 to 70% ethylenically unsaturated non-ionic monomer and
   (c) 0 to 1% cross linker characterised in that the monomers also include (d) 1 to 70% by weight ethylenically unsaturated monomer that carries a pendant group $-A_mB_nA_pR$ wherein B is ethyleneoxy, n is at least 2, A is propyleneoxy or butyleneoxy, m and p are each a number less than n and R is a hydrophobic group containing at least 8 carbon atoms.

2. A method according to claim 1 in which n is at least 5, preferably 10 to 100 and m and p are each zero.

3. A method according to claim 1 in which R is selected from polyoxypropylene, polyoxybutylene and hydrocarbyl groups of 8 to 30 carbon atoms selected from alkyl, aralkyl, aryl, alkaryl and cycloalkyl.

4. A method according to claim 1 in which R is a hydrocarbyl group containing 10 to 24 carbon atoms and selected from alkyl and alkaryl.

5. A method according to claim 1 in which the monomer has the formula $CH_2=CR'CH_2OB_nA_mA_pR$ where R' is selected from hydrogen and methyl.

6. A method according to claim 1 in which the ionic monomer is cationic.

7. A method according to claim 1 in which the amount of ionic monomer (a) is 10 to 70%, the amount of non-ionic monomer (b) is 20 to 70% and the copolymer has been made by oil in water emulsion polymerisation to produce a copolymer which is insoluble and non-swellable in water but is soluble or swellable in water in the presence of acid or alkali, and in which the aqueous adhesive is formed by wetting with water a dry coating on the substrate of the copolymer and of an acid or alkali that will react with ionic groups in the copolymer to render it soluble or swellable.

8. A method according to claim 7 in which the non-ionic monomer is $C_{1-4}$ alkyl (meth) acrylate.

9. A method according to claim 1 in which the copolymer is made by reverse phase or gel polymerisation and in which monomers (a) and (b) are water soluble.

10. A method according to claim 9 in which the polymer is made by reverse phase polymerisation to a dry particle size of below 10 microns and the monomers include cross linking agent in an amount sufficient to render the particles swellable but insoluble in water.

11. A method according to claim 9 in which the aqueous adhesive is formed by wetting a prepaste coating on the substrate of the copolymer.

12. A method according to claim 1 in which the ionic monomer is selected from dialkylaminoalkyl (meth)-acrylates or -acrylamides.

13. A method according to claim 1 in which the fibrous sheet is a wallcovering and the substrate is a wall.

14. A method according to claim 1 in which the non-ionic monomer (b) is selected from water soluble monomers, alkyl (meth) acrylates, hydroxy alkyl (meth) acrylates, alkoxy alkyl (meth) acrylates, vinyl alkanoates, vinylidene halides, vinyl halides, acrylonitrile, dihalo substituted styrene, alkyl substituted styrene and styrene.

15. A method according to claim 1 in which the non-ionic monomer (b) is selected from water soluble monomers and $C_{1-4}$ alkyl (meth) acrylates.

* * * * *